United States Patent
Mikawa

(10) Patent No.: US 9,145,796 B2
(45) Date of Patent: Sep. 29, 2015

(54) CONTROL UNIT FOR VARIABLE VALVE TIMING MECHANISM AND CONTROL METHOD FOR VARIABLE VALVE TIMING MECHANISM

(71) Applicant: HITACHI AUTOMOTIVE SYSTEMS, LTD., Hitachinaka-shi, Ibaraki (JP)

(72) Inventor: Kentaro Mikawa, Isesaki (JP)

(73) Assignee: HITACHI AUTOMOTIVE SYSTEMS, LTD., Hitachinaka-Shi, Ibaraki (JP)

( * ) Notice: Subject to any disclaimer, the term of this patent is extended or adjusted under 35 U.S.C. 154(b) by 81 days.

(21) Appl. No.: 13/845,895

(22) Filed: Mar. 18, 2013

(65) Prior Publication Data
US 2013/0247853 A1 Sep. 26, 2013

(30) Foreign Application Priority Data
Mar. 21, 2012 (JP) ................. 2012-063831

(51) Int. Cl.
*F01L 1/34* (2006.01)
*F02D 13/00* (2006.01)
*F02D 41/04* (2006.01)
*F02D 41/06* (2006.01)
*F02N 19/00* (2010.01)
*F02D 35/00* (2006.01)
*F02D 41/00* (2006.01)

(52) U.S. Cl.
CPC . *F01L 1/34* (2013.01); *F02D 13/00* (2013.01); *F02D 41/042* (2013.01); *F02D 41/062* (2013.01); *F02N 19/004* (2013.01); *F01L 2800/01* (2013.01); *F01L 2820/032* (2013.01); *F02D 35/0007* (2013.01); *F02D 2041/001* (2013.01)

(58) Field of Classification Search
CPC ... F01L 1/34; F01L 2800/01; F01L 2820/032; F02D 13/00; F02D 41/042; F02D 41/062; F02D 35/0007; F02D 2041/001; F02N 19/004
USPC ................. 123/90.15, 90.17, 90.31
See application file for complete search history.

(56) References Cited

U.S. PATENT DOCUMENTS

| 8,220,426 B2 | 7/2012 | Uehama et al. | |
|---|---|---|---|
| 2006/0207539 A1* | 9/2006 | Miyakoshi | 123/90.17 |
| 2008/0011253 A1* | 1/2008 | Nakamura | 123/90.15 |
| 2009/0265077 A1* | 10/2009 | Urushihata | 701/103 |
| 2010/0180844 A1 | 7/2010 | Uehama et al. | |

FOREIGN PATENT DOCUMENTS

| JP | 2006-257959 A | 9/2006 |
|---|---|---|
| JP | 2008-019756 A | 1/2008 |
| JP | 2009-013975 A | 1/2009 |
| JP | 2009-209849 A | 9/2009 |

* cited by examiner

*Primary Examiner* — Zelalem Eshete
(74) *Attorney, Agent, or Firm* — Foley & Lardner LLP

(57) ABSTRACT

A control unit for a variable valve timing mechanism for changing a cam phase by an actuator corrects the operation amount of the actuator immediately after an engine is started based on at least an engine rotation angle and a cam phase angle in an engine stop state.

19 Claims, 15 Drawing Sheets

CONTROL UNIT FOR VARIABLE VALVE TIMING MECHANISM AND CONTROL METHOD FOR VARIABLE VALVE TIMING MECHANISM

BACKGROUND OF THE INVENTION

1. Field of the Invention

The present invention relates to a control unit for a variable valve timing mechanism (VTC) for changing the rotation phase of a camshaft with respect to a crankshaft to change at least either valve timing (opening and closing timing) of an intake valve or an exhaust valve, and a control method for the same.

2. Description of Related Art

To change valve timing according to the engine operating conditions, VTC is known in which the rotation phase of the camshaft with respect to the crankshaft is changed by an actuator. In an engine equipped with VTC, there is proposed a technique for changing VTC to valve timing suitable for starting when an engine is stopped to ensure the starting performance of the engine, as described in Japanese Laid-Open (Kokai) Patent Application Publication No. 2009-13975.

In the meantime, VTC attached to an end of the camshaft is subjected to an alternating torque (cam torque), made up of a reaction force of a valve spring and an inertial force by the mass of a movable part, according to the rotation of the camshaft. In a low rpm (revolutions per minute) range of the engine, in which the alternating frequency of the cam torque is equal to or less than the drive frequency of VTC, the reaction force of the valve spring becomes dominant unlike in a high rpm range of the engine, in which the cam torque can be regarded as an average value, to make the cam torque have a substantially sinusoidal waveform. Then, depending on the magnitude of the cam torque, the angle of VTC may vary immediately after engine start, and thus, there is a possibility that the VTC angle suitable for engine start cannot be maintained.

SUMMARY OF THE INVENTION

A control unit for VTC for changing a cam phase by an actuator corrects an operation amount of the actuator immediately after an engine is started based on at least an engine rotation angle and a cam phase angle in an engine stop state.

Other objects and features of aspects of this invention will be understood from the following description with reference to the accompanying drawings.

DESCRIPTION OF THE EMBODIMENTS

An embodiment for carrying out the present invention will now be described in detail with reference to the accompanying drawings.

Figure 1:
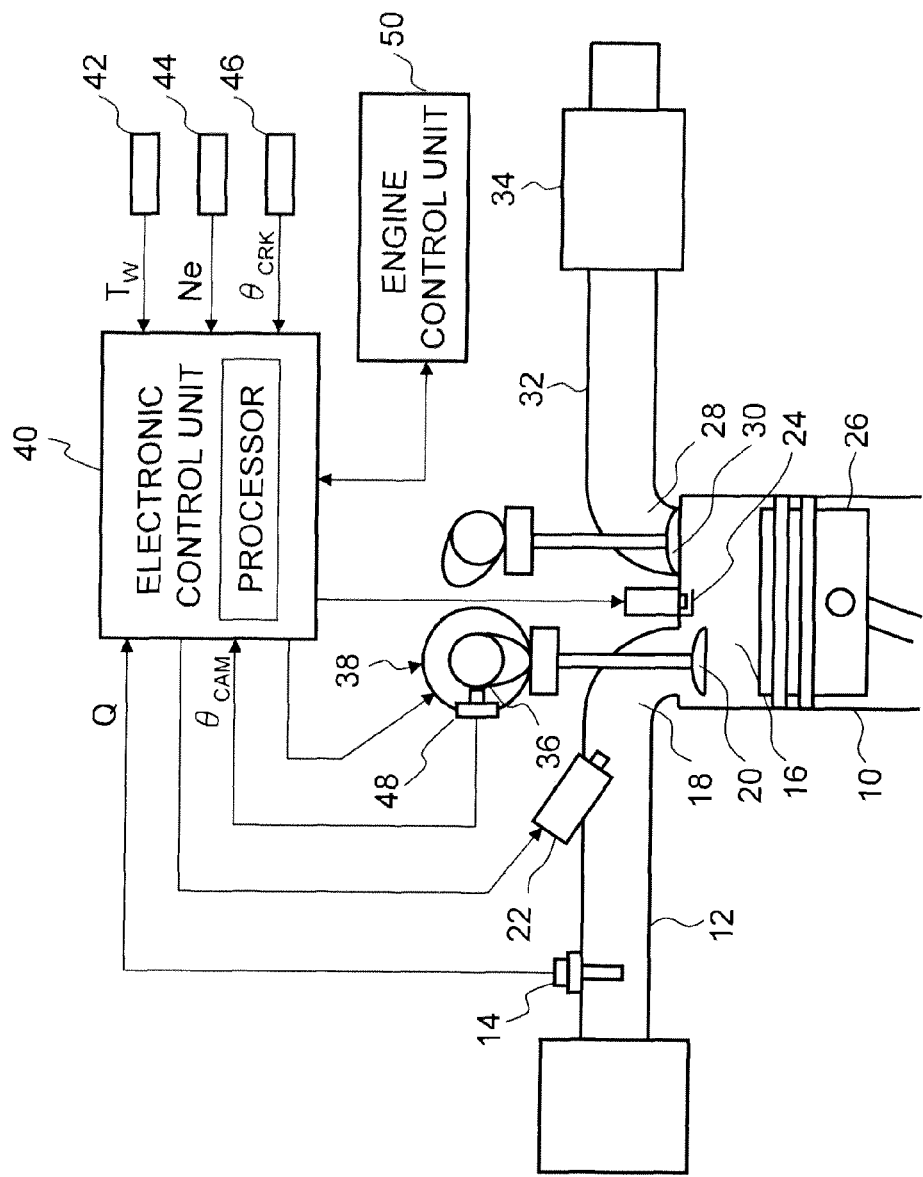
FIG. 1 is a schematic configuration view of a vehicle engine system.

FIG. 1 illustrates the structure of a vehicle engine system to which a VTC control unit according to the embodiment is applied.

An engine 10 is, for example, an in-line four-cylinder gasoline engine, in which an intake air flow sensor 14 for detecting an intake air flow Q as an example of a load on engine 10 is fitted into an intake pipe 12 for introducing intake air into each cylinder. As intake air flow sensor 14, for example, a hot-wire flowmeter such as an air flowmeter can be used. Note that the load on engine 10 is not limited to intake air flow Q, and a known state quantity closely associated with torque, such as intake air negative pressure, supercharging pressure, throttle opening, or accelerator opening, can be used.

An intake valve 20 is provided in an intake port 18 for introducing intake air into a combustion chamber 16 of each cylinder to open and close the opening of intake port 18. A fuel injector 22 for injecting fuel toward intake port 18 is fitted in a portion of intake pipe 12 located in the air intake upstream of intake valve 20. Fuel injector 22 is an electromagnetic fuel injector, which injects fuel when a magnetic attractive force is generated by energization of a magnet coil to lift a valve biased by a spring in a valve closing direction so as to open the valve. Fuel with pressure regulated to predetermined pressure is supplied to fuel injector 22 so that an amount of fuel proportional to the valve opening time is injected.

Fuel injected from fuel injector 22 is introduced into combustion chamber 16 through a gap between intake port 18 and intake valve 20 together with intake air, and ignited and burned by spark ignition of a spark plug 24. The pressure exerted by the burning pushes a piston 26 down toward a crankshaft (not illustrated) to drive the crankshaft to rotate.

Furthermore, an exhaust valve 30 is provided in an exhaust port 28 for discharging exhaust gas from combustion chamber 16 to open and close the opening of exhaust port 28. When exhaust valve 30 is opened, exhaust gas is exhausted into an exhaust pipe 32 through a gap between exhaust port 28 and exhaust valve 30. A catalytic converter 34 is arranged in exhaust pipe 32. Harmful substances in the exhaust gas are converted into harmless components by catalytic converter 34 and are exhausted from a terminal opening of exhaust pipe 32 into the atmosphere. For example, as catalytic converter 34, three-way catalysts for converting CO (carbon monoxide), HC (hydrocarbon), and NOx (nitrogen oxide) in the exhaust gas at the same time can be used.

Figure 2:
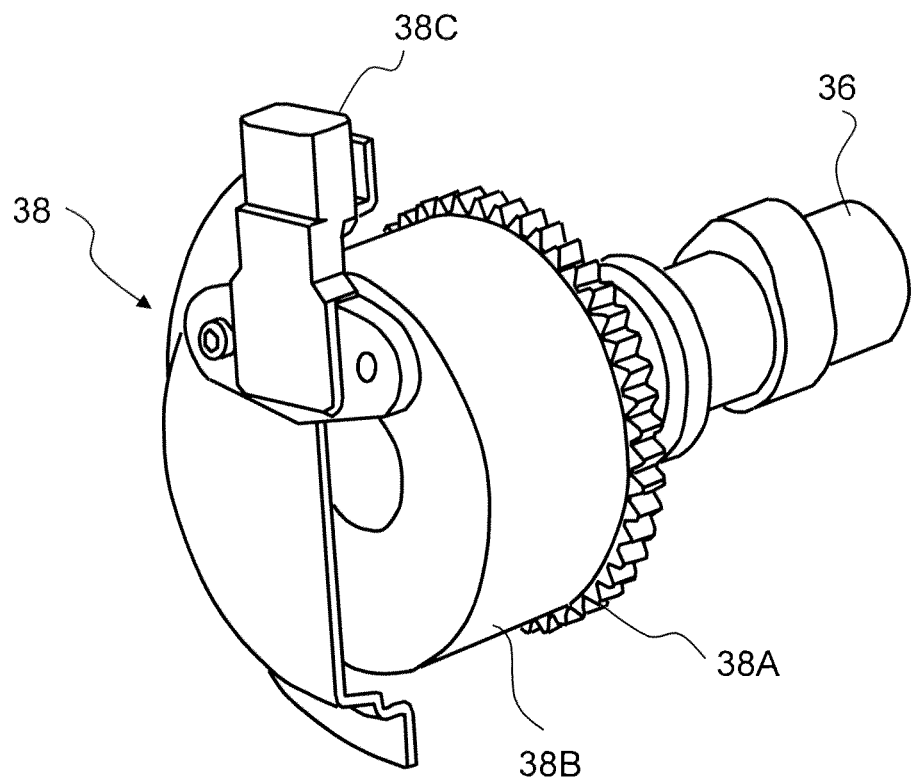
FIG. 2 is a perspective view of the details of VTC.

A VTC 38 is attached to the end of intake camshaft 36 for driving intake valve 20 to open and close, and VTC 38 changes the valve timing of intake valve 20 by changing the rotation phase of an intake camshaft 36 with respect to the crankshaft. As illustrated in FIG. 2, VTC 38 is integrated with a cam sprocket 38A, around which a cam chain for transmitting a rotational driving force of the crankshaft is wound, in which an electric motor 38B (electric actuator) with a built-in reducer rotates intake camshaft 36 relative to cam sprocket 38A to advance or retard the valve timing. Here, indicated by reference numeral 38C in FIG. 2 is a connector for connecting a harness to supply power to electric motor 38B.

Note that VTC 38 is not limited to the structure illustrated in FIG. 2, and any other structure can be adopted as long as the valve timing can be changed by any of various actuators such as an electric motor and a hydraulic motor. Furthermore, VTC 38 is not limited to being provided for intake valve 20, and it may be provided for at least either intake valve 20 or exhaust valve 30.

Fuel injector 22, spark plug 24, and VTC 38 are controlled by an electronic control unit 40 with a built-in microcomputer (processor). Electronic control unit 40 inputs signals from various sensors to determine each operation amount of fuel injector 22, spark plug 24, and VTC 38 according to a pre-stored control program to be output. In fuel injection control using fuel injector 22, for example, fuel is injected individually in time with an intake stroke of each cylinder. This is so-called "sequential injection control." Note that VTC 38 may also be controlled by another electronic control unit different from electronic control unit 40.

Input to electronic control unit 40 in addition to a signal from intake air flow sensor 14 are signals respectively from a water temperature sensor 42 for detecting a coolant temperature (water temperature) Tw of engine 10, an engine speed sensor 44 for detecting an engine speed Ne of engine 10, a crank angle sensor 46 for detecting a crankshaft rotation angle (angle from a reference position) $\theta_{CRK}$, and a cam angle sensor 48 for detecting a rotation angle $\theta_{CAM}$ of intake camshaft 36. Here, rotation angle $\theta_{CRK}$ of the crankshaft is taken as an example of the engine rotation angle and rotation angle $\theta_{CAM}$ of intake camshaft 36 is taken as an example of the cam phase angle. Furthermore, electronic control unit 40 is connected to an engine control unit 50 for electronically controlling engine 10 through an in-car network such as CAN (Controller Area Network) so that an ON and OFF signal of a starter switch can be input. Note that intake air flow Q, water temperature Tw, engine speed Ne, crankshaft rotation angle $\theta_{CRK}$, and rotation angle $\theta_{CAM}$ of intake camshaft 36 may also be read from engine control unit 50 instead of being read from the respective sensors.

In addition to the control of VTC 38 to be described later, electronic control unit 40 controls fuel injector 22 and spark plug 24 as follows, that is, electronic control unit 40 reads intake air flow Q and engine speed Ne from intake air flow sensor 14 and engine speed sensor 44, respectively, to calculate a basic amount of fuel injection according to the engine operating conditions based on intake air flow Q and engine speed Ne. Furthermore, electronic control unit 40 reads water temperature Tw from water temperature sensor 42 to calculate an amount of fuel injection obtained by correcting the basic amount of fuel injection by water temperature Tw and the like. Then, electronic control unit 40 injects fuel corresponding to the amount of fuel injection from fuel injector 22 at a timing according to the engine operating conditions to actuate spark plug 24 accordingly to ignite and burn a mixture of fuel and intake air. At this time, electronic control unit 40 reads an air-fuel ratio from an unillustrated air-fuel ratio sensor to perform feedback control on fuel injector 22 so that the air-fuel ratio in the exhaust gas approximates a theoretical air-fuel ratio.

Figure 3:
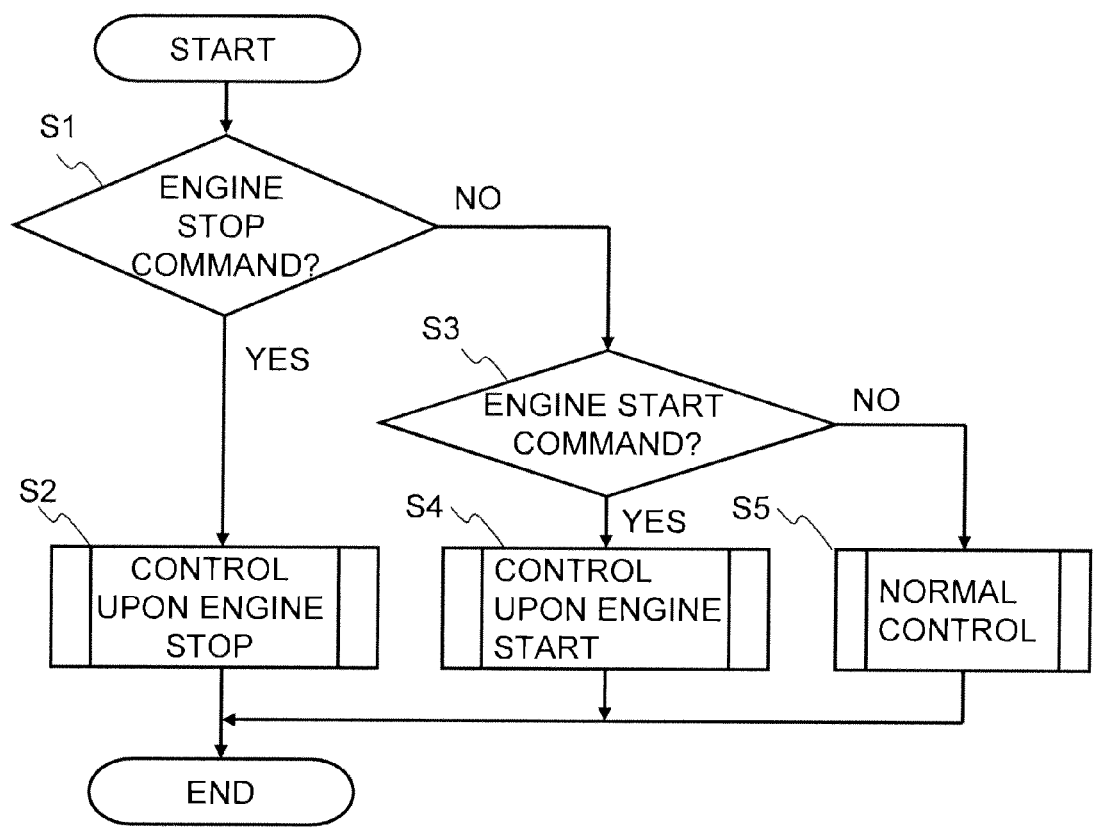
FIG. 3 is a flowchart of a main routine of a control program.

FIG. 3 illustrates an example of a main routine of a control program to be executed repeatedly by electronic control unit 40 after the start of electronic control unit 40.

In step 1 (abbreviated as "S1" in FIG. 3; the same will be applied hereinafter), electronic control unit 40 reads a signal of the starter switch, for example, from engine control unit 50 to determine whether the signal changes from ON to OFF in order to determine whether a command to stop engine 10 is given. Then, when electronic control unit 40 determines that the command to stop engine 10 is given, the procedure proceeds to step 2 (Yes), whereas when it determines that the command to stop engine 10 is not given, the procedure proceeds to step 3 (No).

In step 2, electronic control unit 40 executes a subroutine (the details of which will be described later) for control upon engine stop.

In step 3, electronic control unit 40 reads a signal of the starter switch, for example, from engine control unit 50 to determine whether the signal changes from OFF to ON in order to determine whether a command to start engine 10 is given. Then, when electronic control unit 40 determines that the command to start engine 10 is given, the procedure proceeds to step 4 (Yes), whereas when it determines that the command to start engine 10 is not given, the procedure proceeds to step 5 (No).

In step 4, electronic control unit 40 executes a subroutine (the details of which will be described later) for control upon engine start.

In step 5, electronic control unit 40 executes a subroutine (the details of which will be described later) for normal control, i.e., control while the engine is operating other than that upon engine stop and engine start.

According to this main routine, when the engine stop command is given, control upon engine stop is performed, whereas when the engine start command is given, control upon engine start is performed. Furthermore, when there is no engine stop command or engine start command, normal processing is performed while the engine is operating.

Figure 4:
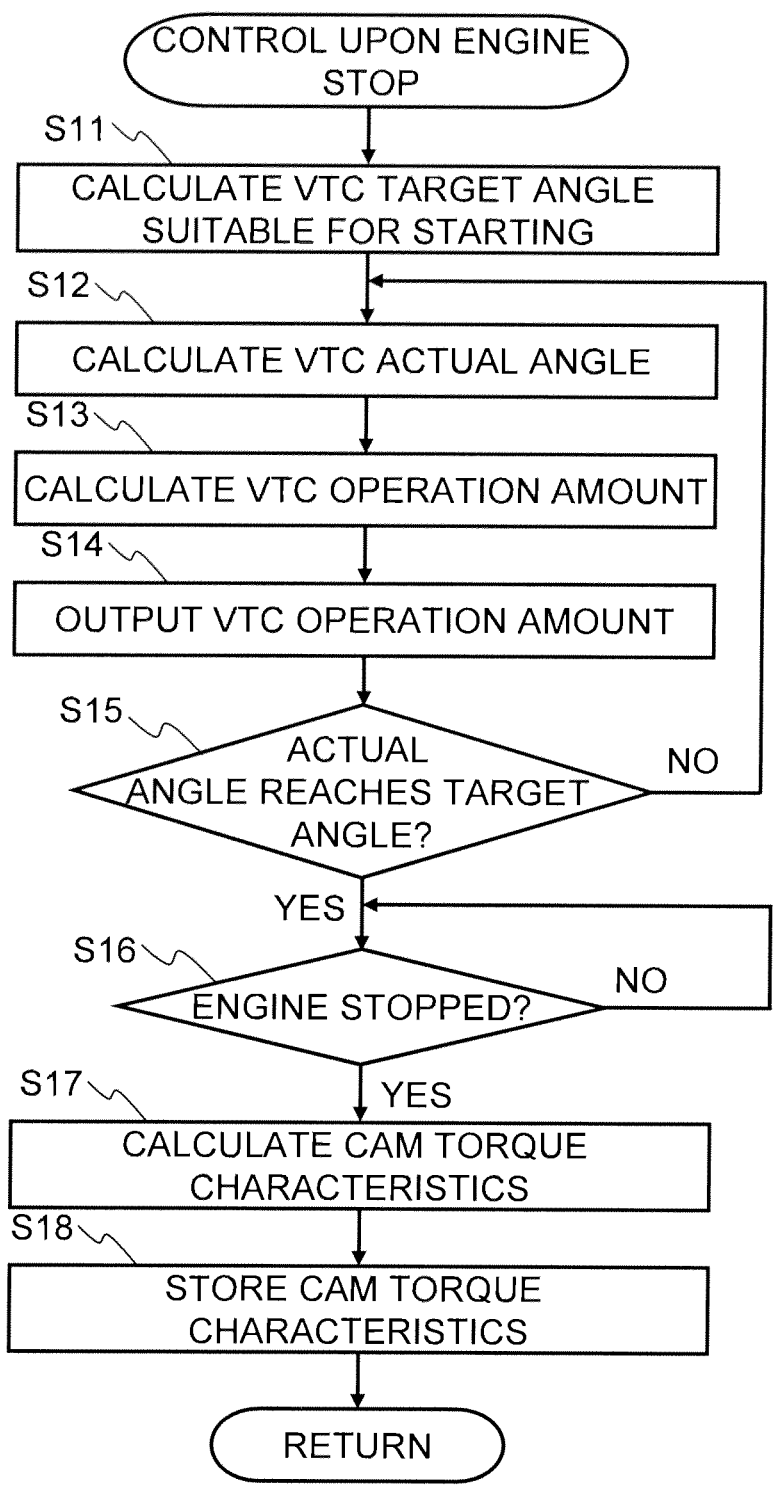
FIG. 4 is a flowchart of a subroutine for control upon engine stop.

FIG. 4 illustrates an example of a subroutine executed by electronic control unit 40 to perform control upon engine stop.

In step 11, electronic control unit 40 reads a control value, for example, from a flash ROM (Read Only Memory) to calculate a target angle of VTC 38 suitable for starting engine 10.

In step 12, electronic control unit 40 calculates an actual angle of VTC 38 (actual angle from a reference position). In other words, electronic control unit 40 reads a rotation angle $\theta_{CRK}$ of the crankshaft and a rotation angle $\theta_{CAM}$ of intake camshaft 36 from crank angle sensor 46 and cam angle sensor 48, respectively. Then, for example, electronic control unit 40 subtracts rotation angle $\theta_{CRK}$ of the crankshaft from rotation angle $\theta_{CAM}$ of intake camshaft 36 to determine the actual angle of VTC 38 with an advance side chosen as positive values.

In step 13, electronic control unit 40 calculates an operation amount of VTC 38 (e.g., the duty ratio of electric motor 38B) based on deviation between the target angle and the actual angle of VTC 38.

In step 14, electronic control unit 40 outputs the operation amount of VTC 38 to electric motor 38B as the actuator.

In step 15, electronic control unit 40 determines whether the actual angle of VTC 38 reaches the target angle. Then, when electronic control unit 40 determines that the actual angle reaches the target angle, the procedure proceeds to step 16 (Yes), whereas when it determines that the actual angle does not reach the target angle, the procedure returns to step 12 (No).

In step 16, electronic control unit 40 reads engine speed Ne, for example, from engine speed sensor 44 to determine whether the read engine speed Ne becomes 0 to thereby determine whether engine 10 is stopped. Then, when electronic control unit 40 determines that engine 10 is stopped, the procedure proceeds to step 17 (Yes), whereas when it determines that engine 10 is not stopped, the procedure stands by (No), i.e., electronic control unit 40 stands by until engine 10 is stopped.

Figure 5:
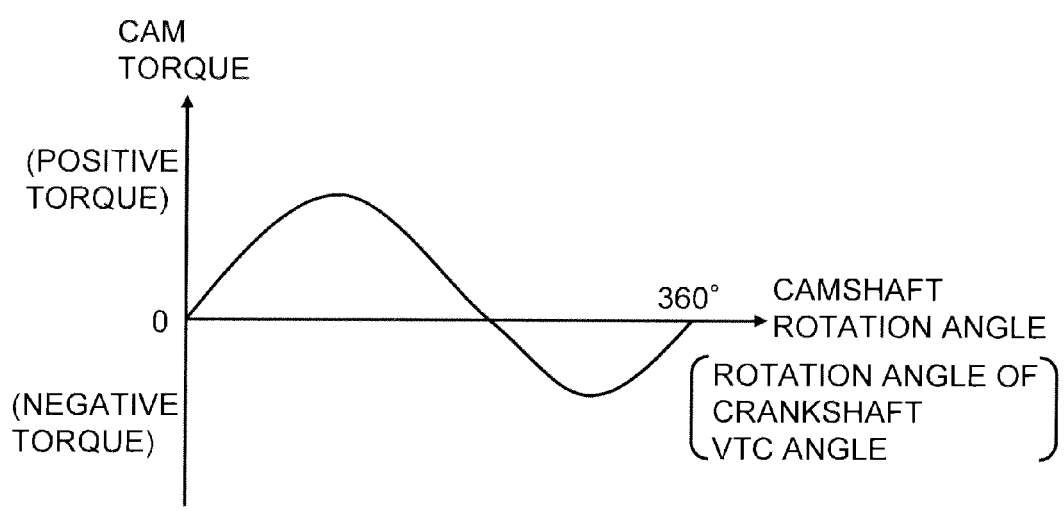
FIG. 5 is an explanatory view of a map used to estimate cam torque characteristics.

In step 17, electronic control unit 40 calculates (estimates) the cam torque characteristics (the direction of the cam torque, the magnitude thereof, and the like) according to the rotation angle of intake camshaft 36. In other words, electronic control unit 40 reads rotation angle $\theta_{CRK}$ of the crankshaft from crank angle sensor 46 sequentially until it determines that engine 10 is stopped to determine rotation angle $\theta_{CRK}$ of the crankshaft upon stop of engine 10. Furthermore, for example, electronic control unit 40 adds the target angle of VTC 38 suitable for starting engine 10 to rotation angle $\theta_{CRK}$ of the crankshaft when the camshaft is stopped to calculate the rotation angle of intake camshaft 36. Then, for example, electronic control unit 40 refers to a map as illustrated in FIG. 5 in which a cam torque according to the rotation angle of the camshaft is set to determine the cam torque characteristics according to the rotation angle of intake camshaft 36. In the map illustrated in FIG. 5, the term "positive torque" indicating that the cam torque takes on positive values shifts VTC 38 in a retardation direction, and the term "negative torque" indicating that the cam torque takes on negative values shifts VTC 38 in an advance direction. Furthermore, the positive torque becomes larger than the negative torque due to the rotational resistance of the camshaft and the like.

In step 18, electronic control unit 40 records the cam torque characteristics in a nonvolatile memory such as the flash ROM.

According to this control upon engine stop, VTC 38 is changed to the target angle suitable for starting engine 10. Therefore, upon restart of engine 10, the starting performance of engine 10 can be ensured.

Furthermore, when engine 10 comes to a complete stop, the cam torque characteristics according to the rotation angle of intake camshaft 36 are calculated and recorded in the nonvolatile memory. Therefore, upon restart of engine 10, even if cam angle sensor 48 is not able to detect the rotation angle $\theta_{CAM}$ of intake camshaft 36, the cam torque characteristics when engine 10 is stopped can be identified. When a sensor capable of detecting the rotational speed of intake camshaft 36 is used upon restart of engine 10, processing steps 16 to 18 may be omitted.

Figure 6:
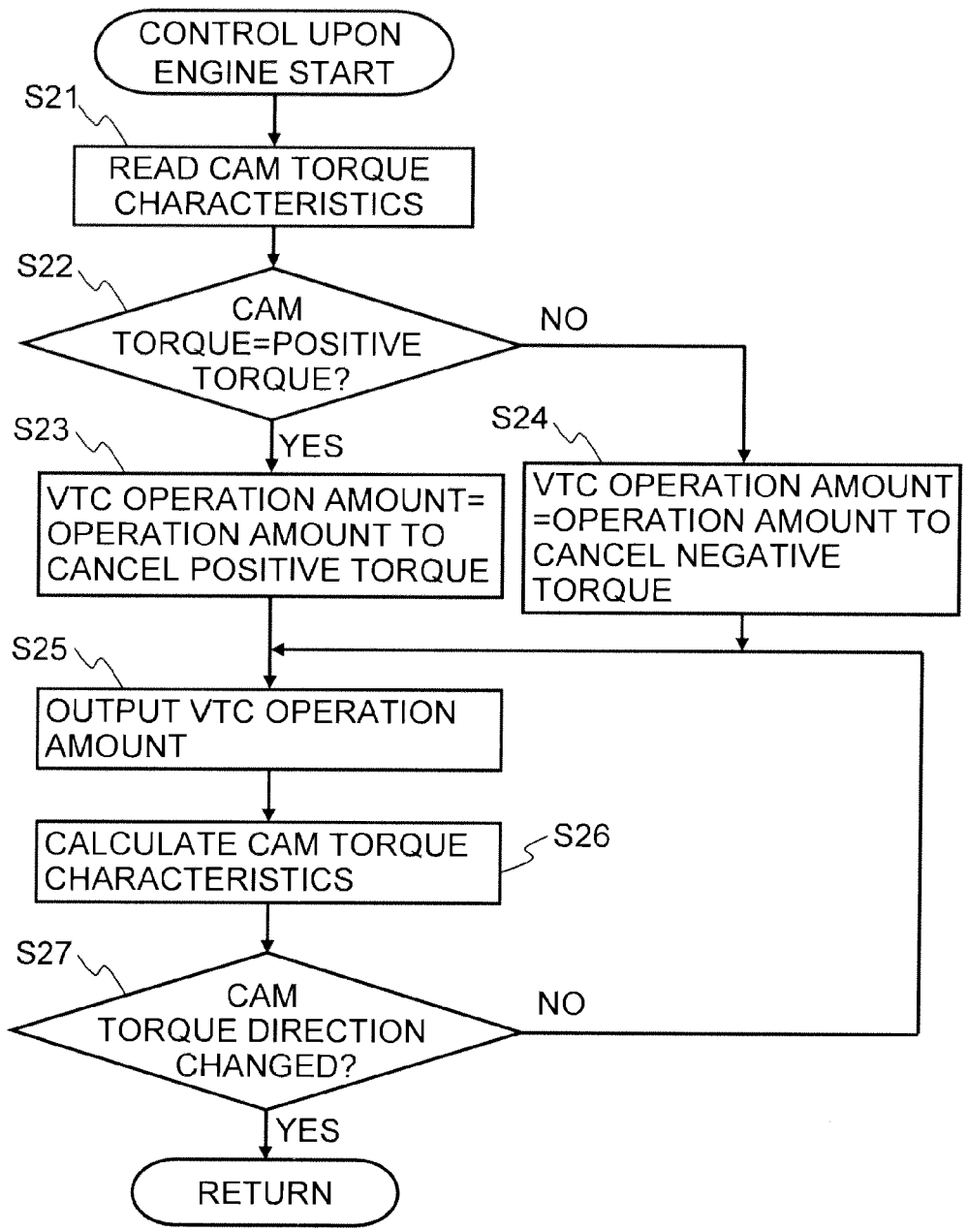
FIG. 6 is a flowchart of a first example of a subroutine for control upon engine start.

If processing for making the actual angle of VTC 38 converge on the target angle is performed for a period after the key-off of the starter switch is detected by engine control unit 50 until engine 10 is stopped, the influence of the cam torque is small. Here, when electric motor 38B of VTC 38 can generate a sufficient torque, since the actual angle of VTC 38 can be changed to the target angle even after engine 10 is stopped, this processing may be performed after the engine is stopped FIG. 6 illustrates a first example of a subroutine executed by electronic control unit 40 to perform control upon engine start. Note that the control upon engine start is continuously performed for a period after key-on of the starter switch is detected by engine control unit 50 until the direction of the cam torque is changed. Note further that the description of common processing with the flowchart illustrated in FIG. 4 is simplified to eliminate redundant description (the same will be applied hereinafter).

In step 21, electronic control unit 40 reads, from the nonvolatile memory, the cam torque characteristics when engine 10 is stopped.

In step 22, electronic control unit 40 analyzes the cam torque characteristics to determine whether the cam torque is a positive torque, i.e., whether to change VTC 38 to a retardation side upon engine start. Then, when electronic control unit 40 determines that the cam torque is the positive torque, the procedure proceeds to step 23 (Yes), whereas when it determines that the cam torque is a negative torque, the procedure proceeds to step 24 (No).

In step 23, electronic control unit 40 sets an operation amount to cancel the positive torque, i.e., an operation amount to take a predetermined positive value (fixed value) as a VTC operation amount upon engine start.

In step 24, electronic control unit 40 sets an operation amount to cancel the negative torque, i.e., an operation amount to take a predetermined negative value (fixed value) as a VTC operation amount upon engine start.

In step 25, electronic control unit 40 outputs the operation amount of VTC 38 to electric motor 38B.

In step 26, electronic control unit 40 calculates cam torque characteristics according to the rotation angle of intake camshaft 36. In other words, electronic control unit 40 reads rotation angle $\theta_{CRK}$ of the crankshaft from crank angle sensor 46 to calculate the rotation angle of intake camshaft 36, for example, by adding the target angle of VTC 38 suitable for starting engine 10 to the rotation angle $\theta_{CRK}$ of the crankshaft when the camshaft is stopped. Then, for example, electronic control unit 40 refers to the map illustrated in FIG. 5 again to determine the cam torque characteristics according to the rotation angle of intake camshaft 36.

Here, for example, the target angle of VTC 38 is normally determined from a map in which a target angle according to the engine speed and the load on engine 10 is set. However, since the temperature of lubricant oil is likely to be low upon engine start, valve timing in a direction to ensure the air intake quantity and compression is set with the emphasis on starting performance. Furthermore, upon hot restart such as after idling stop, valve timing to retard closing of intake valve 20 is set for decompression. Furthermore, when a hybrid vehicle is started with a motor, valve timing to retard closing of intake valve 20 is set in principle, but this is not applied to a case in which the engine may be started in a cold-start condition.

In step 27, for example, electronic control unit 40 compares the cam torque characteristics read in step 21 with the cam torque characteristics calculated in step 26 to determine whether the cam torque direction at the time of starting the control upon engine start is changed (inverted). Then, when electronic control unit 40 determines that the cam torque direction is changed, the processing is ended (Yes), whereas when it determines that the cam torque direction is not changed, the procedure returns to step 25 (No).

According to this control upon engine start, when the cam torque in the engine stop state is a positive torque, i.e., a torque to shift VTC 38 in the retardation direction, an operation amount to cancel the positive torque is set as the VTC operation amount upon engine start. Here, for example, the amount of torque determined from the cam torque characteristics is regarded as a major disturbance, and an operation amount capable of generating such a motor torque that the phase angle of VTC 38 can be maintained even in this state is set. On the other hand, when the cam torque in the engine stop state is a negative torque, i.e., a torque to shift VTC 38 in the advance direction, an operation amount to cancel the negative torque is set as the VTC operation amount upon engine start. Then, the VTC operation amount according to the cam torque direction is output to VTC 38 until the cam torque direction is inverted.

Figure 7:
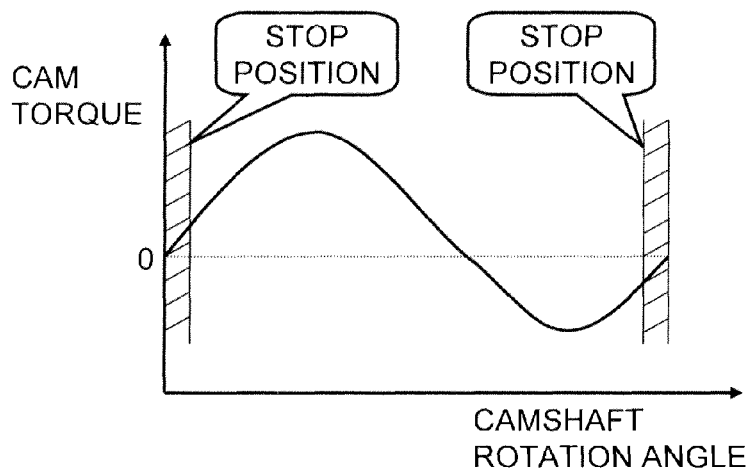
FIG. 7 is an explanatory view of an engine stop state in which a positive torque acts on VTC.
Figure 8:
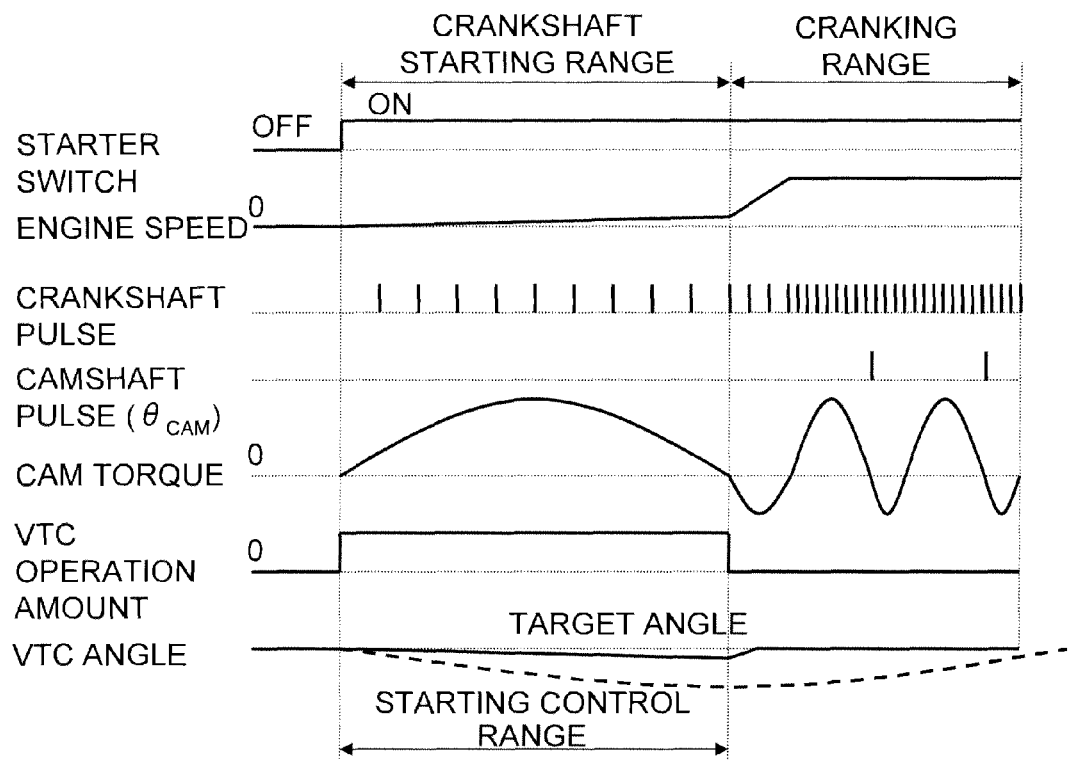
FIG. 8 is an explanatory view of an operation upon starting in such a state that the positive torque acts on VTC.

Therefore, as illustrated in FIG. 7, when intake camshaft 36 begins to open intake valve 20 and VTC 38 is stopped in a position where VTC is subjected to a positive torque, VTC 38 tries to vary on the retardation side by being subjected to the positive torque. However, as illustrated in FIG. 8, in a crankshaft starting range immediately after the starter switch is turned ON, since the VTC operation amount is a predetermined positive value to cancel the positive torque to which VTC 38 is subjected, the angular variation of VTC 38 can be suppressed. Here, since the influence of the cam torque in the crankshaft starting range is significant, the angular variation of VTC 38 can be suppressed effectively if the cam torque is canceled in this range.

Figure 9:
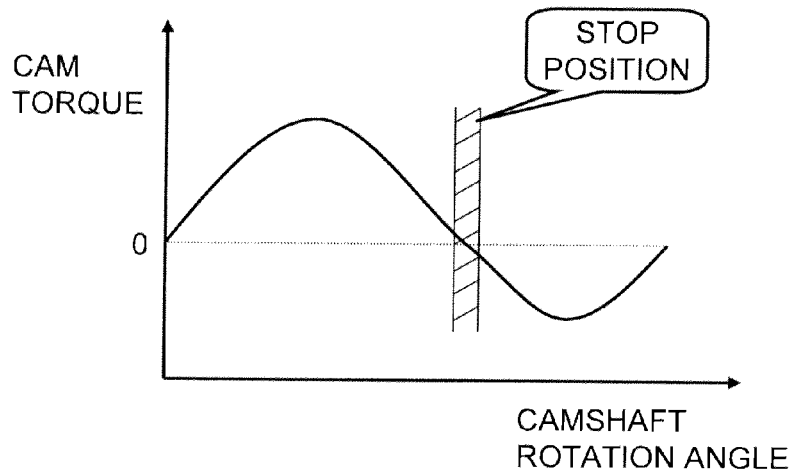
FIG. 9 is an explanatory view of an engine stop state in which a negative torque acts on VTC.
Figure 10:
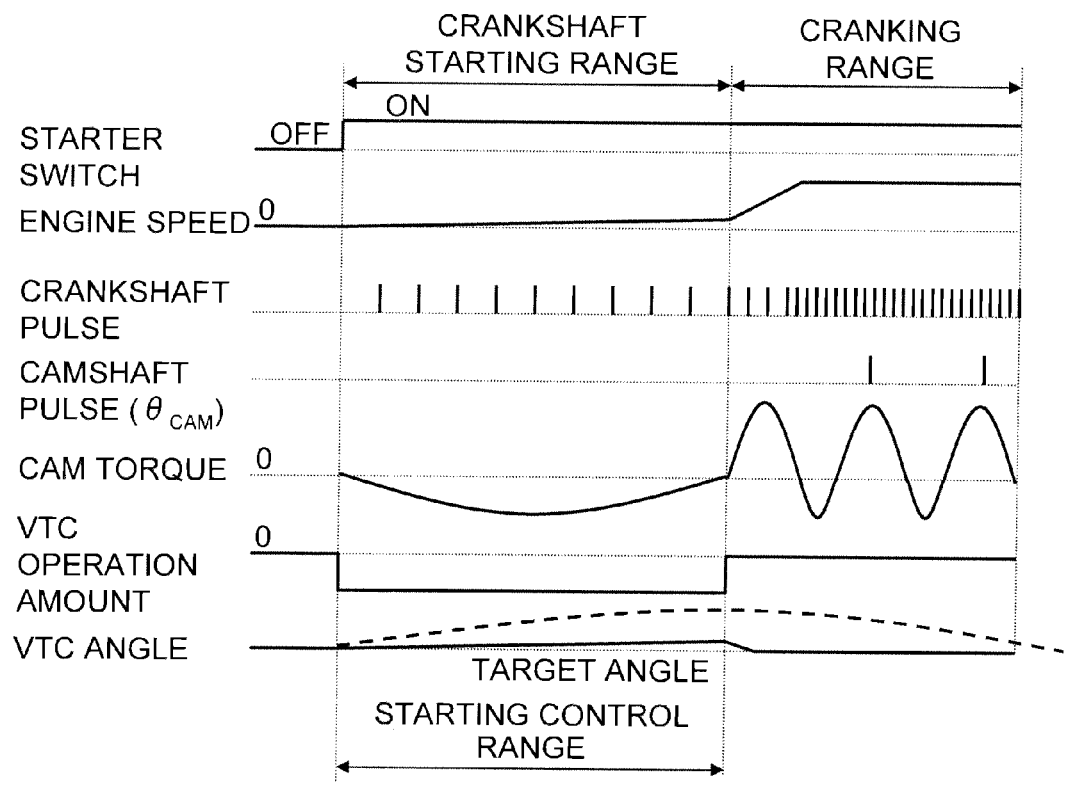
FIG. 10 is an explanatory view of an operation upon starting in such a state that the negative torque acts on VTC.

Furthermore, as illustrated in FIG. 9, when intake camshaft 36 begins to close intake valve 20 and VTC 38 is stopped in a position where VTC is subjected to a negative torque, VTC 38 tries to vary on the advance side by being subjected to the negative torque. However, as illustrated in FIG. 10, in the crankshaft starting range immediately after the starter switch is turned ON, since the VTC operation amount is a predetermined negative value to cancel the negative torque to which VTC 38 is subjected, the angular variation of VTC 38 can be suppressed.

Then, after shifting from the crankshaft starting range to a cranking range, the rotation angle $\theta_{CAM}$ of intake camshaft 36 is detected to cause deviation between the target angle and the actual angle of VTC 38. Therefore, feedback control to reduce this deviation is performed to make VTC 38 converge on the target angle.

This can maintain the angle of VTC 38 suitable for starting the engine upon engine start to ensure starting performance.

Figure 11:
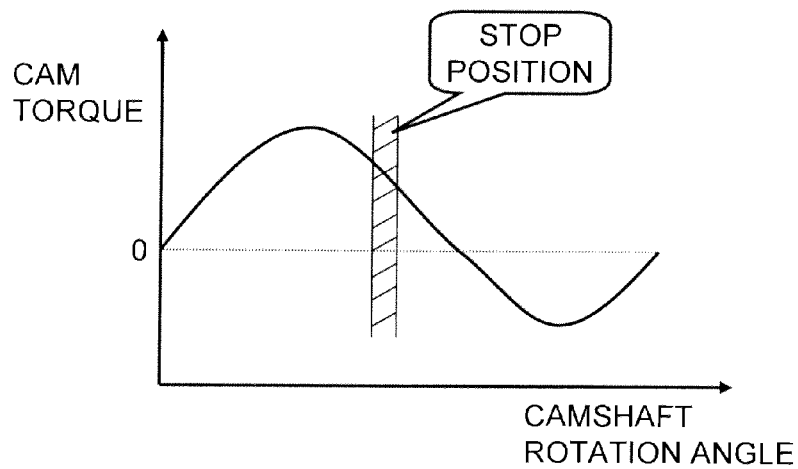
FIG. 11 is an explanatory view of an engine stop state in which a torque corresponding to a stop position acts.
Figure 12:
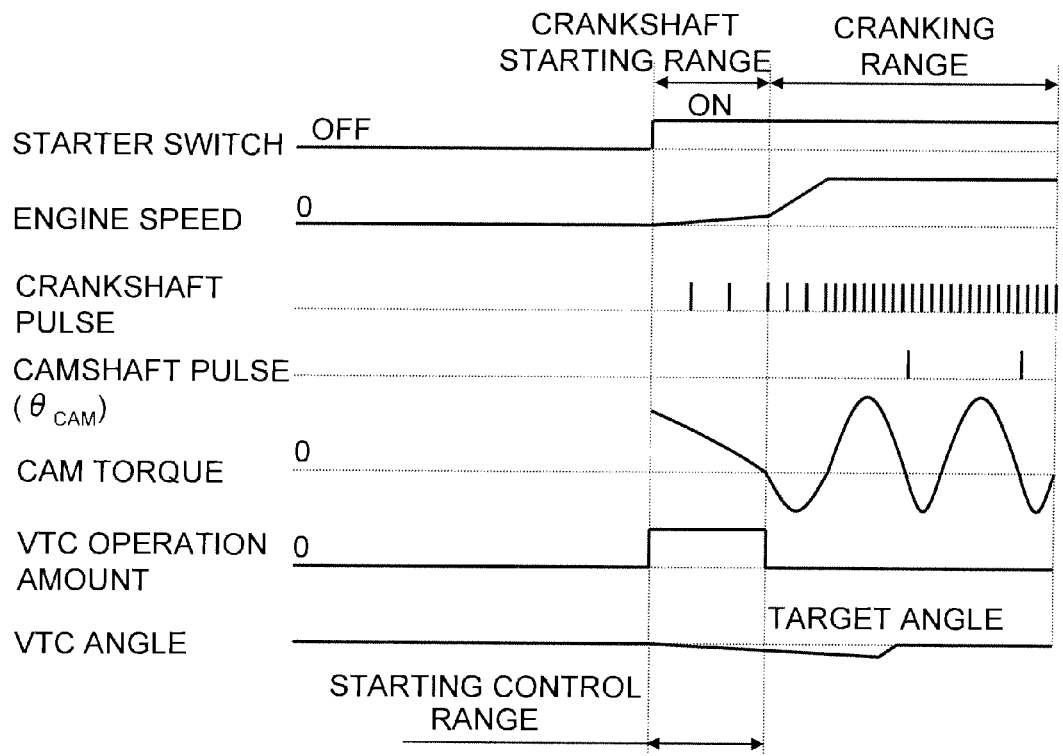
FIG. 12 is an explanatory view of an operation upon starting in such a state that the magnitude of torque corresponding to the stop position acts on VTC.

Here, the VTC operation amount immediately after the starter switch is turned ON may be an operation amount proportional to the magnitude of the cam torque according to the rotation angle $\theta_{CRK}$ of the camshaft obtained by referring to the map illustrated in FIG. 5 again, rather than the predetermined value to take a fixed value according to the positive or negative of the cam torque. Thus, as illustrated in FIG. 11, when intake camshaft 36 is stopped in a position on the way to open intake valve 20, a VTC operation amount proportional to the magnitude of the positive torque is output to VTC 38 upon engine start. Therefore, as illustrated in FIG. 12, VTC 38 is controlled by a VTC operation amount according to the direction and magnitude of the cam torque immediately after the starter switch is turned ON. Since this control is performed with a higher degree of accuracy than the control using the predetermined value as a fixed value, VTC 38 can be easily maintained at the target angle.

Furthermore, the VTC operation amount upon engine start may be corrected as follows, that is, when the motor torque is proportional to a current value as the property of electric motor 38B and applied voltage is constant, coil resistance becomes low as the temperature is reduced. When water temperature or oil temperature related to the temperature of electric motor 38B is reduced, the value of current flowing through electric motor 38B becomes large to increase the motor torque. Therefore, it is possible to perform control in consideration of variations in motor torque with changes in temperature by correcting the VTC operation amount according to the water temperature or oil temperature.

Figure 13:
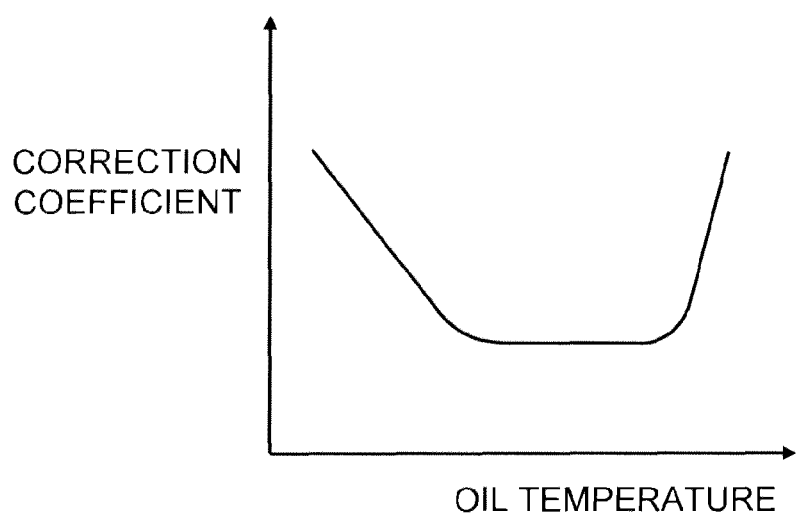
FIG. 13 is an explanatory view of a map used to calculate a correction coefficient according to the oil temperature.

Furthermore, the VTC operation amount upon engine start may also be corrected according to the oil temperature as follows, that is, when the oil temperature is low, the viscosity of lubricant oil is high to increase the cam torque acting on VTC 38. On the other hand, when the oil temperature is high, since the formation of an oil film on intake camshaft 36 is thin, increasing friction, the cam torque acting on VTC 38 becomes high. Therefore, as illustrated in FIG. 13, a map in which a correction coefficient according to the oil temperature is set is referred so as to determine the correction coefficient according to the oil temperature, and then, the VTC operation amount is multiplied by the correction coefficient to correct the VTC operation amount. Thus, control in consideration of the viscosity of lubricant oil can be performed.

Figure 14:
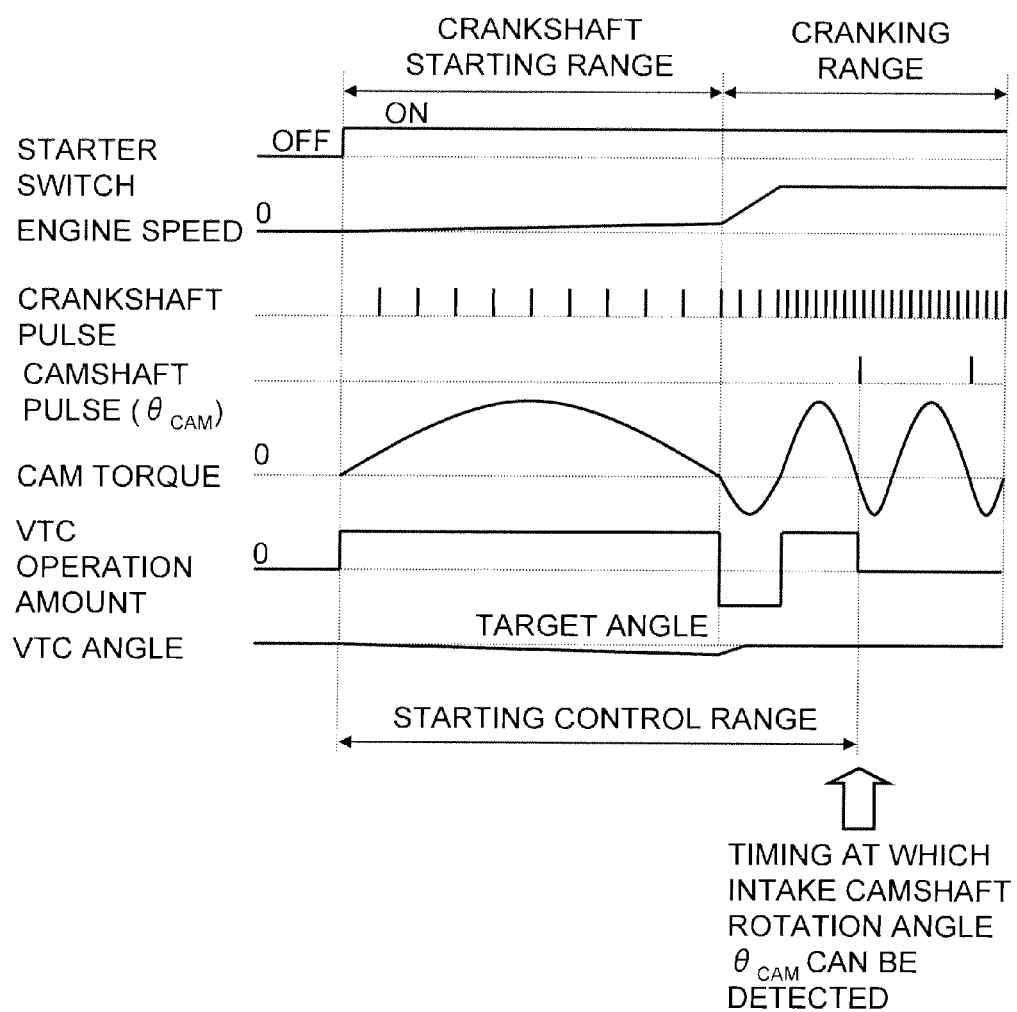
FIG. 14 is an explanatory view of a condition and the operation to stop the correction of a VTC operation amount.

In the control upon engine start as described above, the VTC operation amount is corrected until the cam torque direction is changed; however, as illustrated in FIG. 14, the VTC operation amount may also be corrected after shifting to the cranking range until the rotation angle $\theta_{CAM}$ of intake camshaft 36 can be detected by cam angle sensor 48. Thus, since the VTC operation amount is corrected until feedback control can be performed, the accuracy of maintaining the angle of VTC 38 can be increased.

Furthermore, for example, when the rotation angle of the crankshaft varies due to some kind of external force while engine 10 is being stopped, the correction of the VTC operation amount may be canceled to suppress erroneous correction due to variations in cam torque characteristics.

Figure 15:
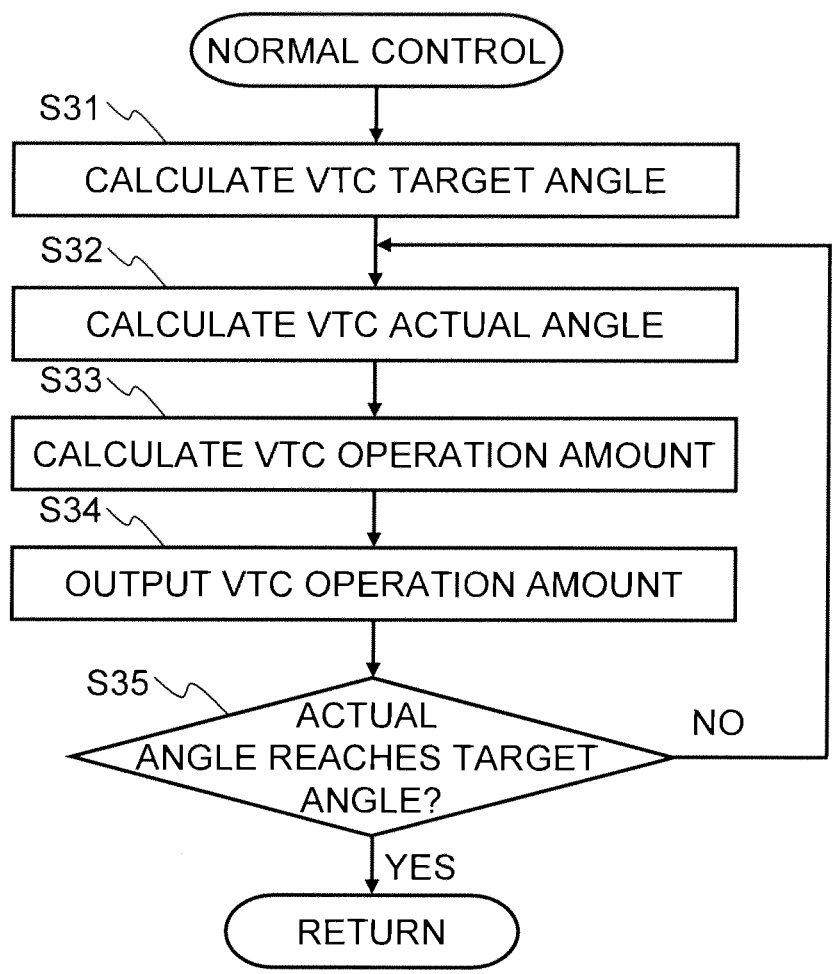
FIG. 15 is a flowchart of a subroutine for normal control.

FIG. 15 illustrates an example of a subroutine executed by electronic control unit 40 to perform normal control.

In step 31, electronic control unit 40 calculates a target angle of VTC 38 according to the engine operating conditions. In other words, electronic control unit 40 reads intake air flow Q, water temperature Tw, and engine speed Ne from intake air flow sensor 14, water temperature sensor 42, and engine speed sensor 44, respectively. Then, for example, electronic control unit 40 refers to a table in which a target angle according to the engine speed and the intake air flow is set per water temperature to determine a target angle according to water temperature Tw, engine speed Ne, and intake air flow Q.

In step 32, electronic control unit 40 calculates the actual angle of VTC 38 by a method similar to step 12.

In step 33, electronic control unit 40 calculates an operation amount of VTC 38 based on deviation between the target angle and the actual angle of VTC 38.

In step 34, electronic control unit 40 outputs the VTC operation amount to electric motor 38B.

In step 35, electronic control unit 40 determines whether the actual angle of VTC 38 reaches the target angle. Then, when electronic control unit 40 determines that the actual angle reaches the target angle, the processing is ended (Yes), whereas when it determines that the actual angle does not reach the target angle, the procedure returns to step 32 (No).

According to this normal control, VTC 38 is controlled by the target angle according to the engine operating conditions. Thus, the target angle according to the engine operating conditions can be set appropriately to improve, for example, responsiveness, torque, fuel consumption, and the like.

Figure 16:
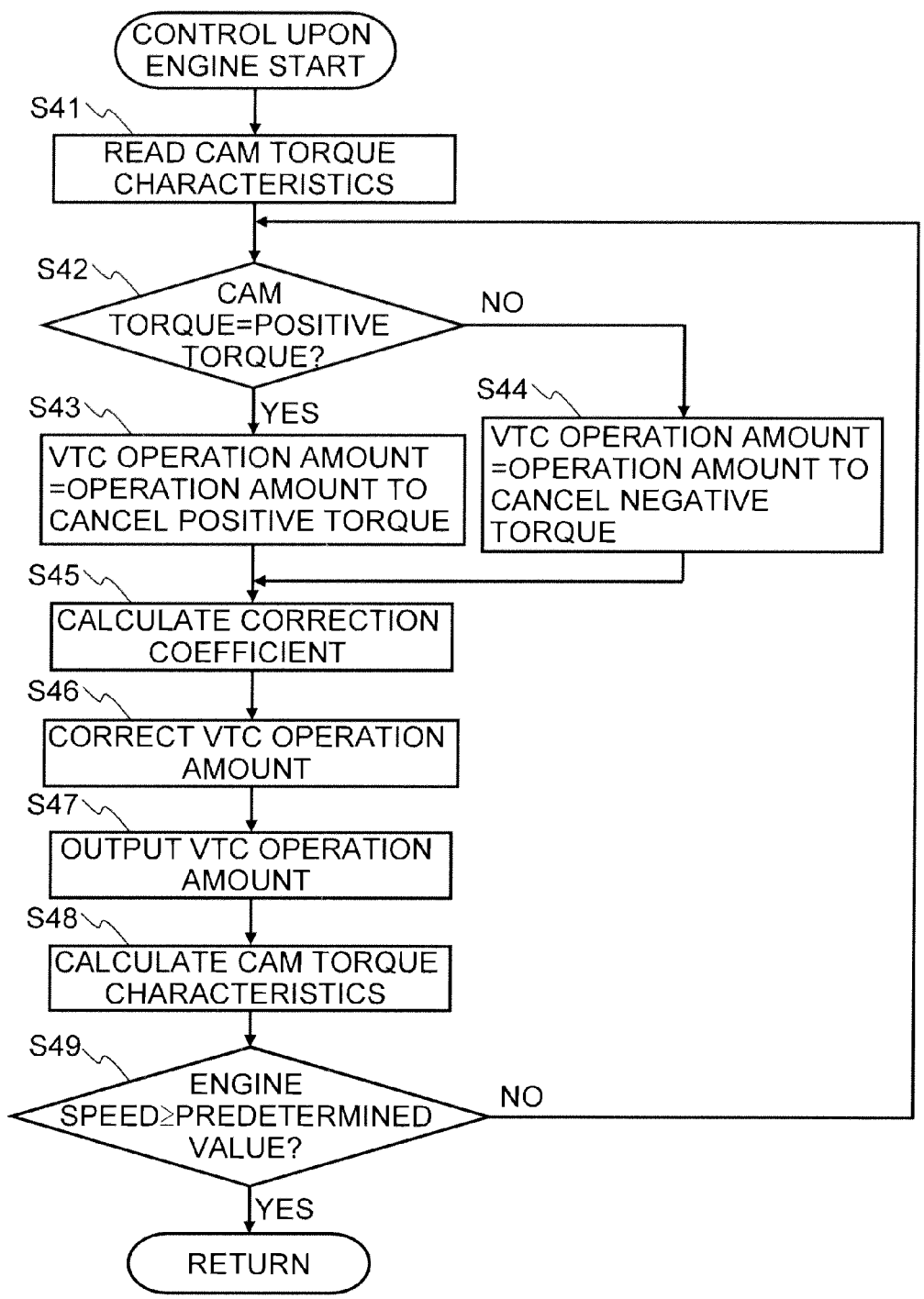
FIG. 16 is a flowchart of a second example of the subroutine for control upon engine start.

FIG. 16 illustrates a second example of the subroutine executed by electronic control unit 40 to perform control upon engine start. Note that the control upon engine start is continuously performed for a period after key-on of the starter switch is detected by engine control unit 50 until engine speed Ne rises to some extent. Note further that the description of common processing with the aforementioned first example is simplified from the viewpoint of eliminating redundant description.

In step 41, electronic control unit 40 reads, from the nonvolatile memory, the cam torque characteristics when engine 10 is stopped.

In step 42, electronic control unit 40 analyzes the cam torque characteristics to determine whether the cam torque is a positive torque, i.e., whether to change VTC 38 to a retardation side upon engine start. Then, when electronic control unit 40 determines that the cam torque is the positive torque, the procedure proceeds to step 43 (Yes), whereas when it determines that the cam torque is a negative torque, the procedure proceeds to step 44 (No).

In step 43, electronic control unit 40 sets, as the VTC operation amount upon engine start, an operation amount to cancel the positive torque, i.e., an operation amount to take a predetermined positive value.

In step 44, electronic control unit 40 sets, as the VTC operation amount upon engine start, an operation amount to cancel the negative torque, i.e., an operation amount to take a predetermined negative value.

Figure 17:
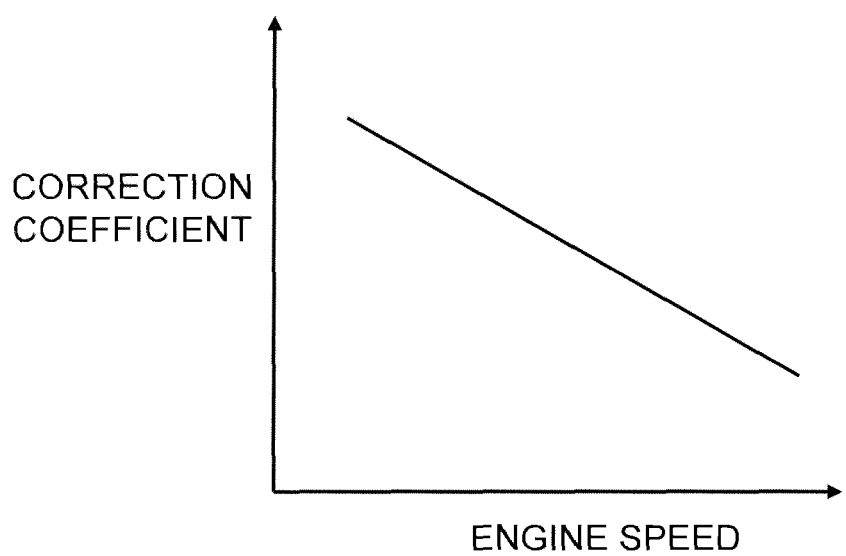
FIG. 17 is an explanatory view of a map used to calculate a correction coefficient according to the engine speed.

In step 45, electronic control unit 40 calculates a correction coefficient for correcting the VTC operation amount according to the engine speed of engine 10. In other words, electronic control unit 40 reads engine speed Ne from engine speed sensor 44 and refers to a map as illustrated in FIG. 17 in which a correction coefficient according to the engine speed is set to determine a correction coefficient according to engine speed Ne. In the map illustrated in FIG. 17, the lower the engine speed, the greater the correction coefficient, i.e., the map has such characteristics that the correction coefficient becomes smaller as the engine speed is increased. This is to reduce the VTC operation amount little by little in order to suppress rapid changes in VTC operation amount, resulting in smooth control.

In step 46, electronic control unit 40 corrects the VTC operation amount by multiplying the VTC operation amount by the correction coefficient.

In step 47, electronic control unit 40 outputs the operation amount of VTC 38 to electric motor 38B.

In step 48, electronic control unit 40 calculates cam torque characteristics according to the rotation angle of intake camshaft 36 by a method similar to step 26.

In step 49, electronic control unit 40 reads engine speed Ne from engine speed sensor 44 to determine whether the read engine speed Ne is equal to or greater than a predetermined value for defining a high rpm range in which the cam torque can be regarded as an average value. Then, when electronic control unit 40 determines that engine speed Ne is equal to or greater than the predetermined value, the processing is ended (Yes), whereas when it determined that engine speed Ne is less than the predetermined value, the procedure returns to step 42 (No).

Figure 18:
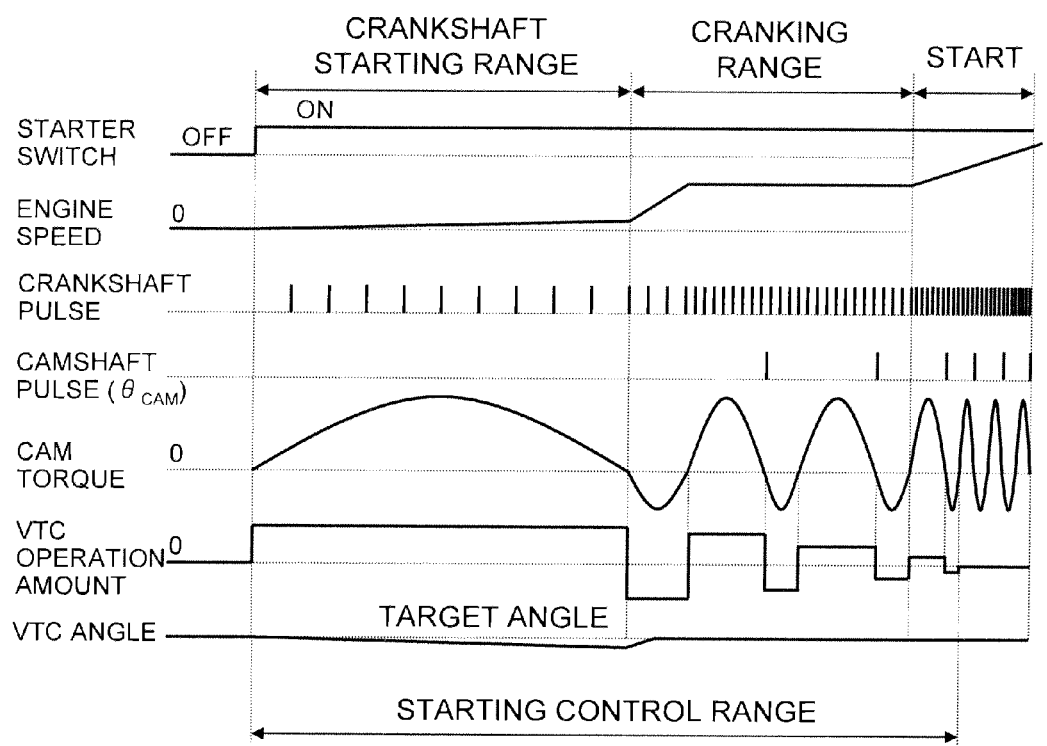
FIG. 18 is an explanatory view of another condition and the operation to stop the correction of the VTC operation amount.

According to this control upon engine start, in addition to the operations and effects of the aforementioned first example, since the VTC operation amount is corrected until the early stage of starting, in which feedback control is not sufficiently performed and hence the cam torque cannot be regarded as the average value as illustrated in FIG. 18, the accuracy of maintaining the angle of VTC 38 can be increased. Furthermore, since the operation amount of VTC 38 is corrected according to the engine speed, excessive correction is suppressed and hence the angular variation of VTC 38 can be smoothened.

Note that some of the points described in each example may be replaced or combined appropriately.

The entire contents of Japanese Patent Application No. 2012-063831, filed Mar. 21, 2012, are incorporated herein by reference.

While only a select embodiment has been chosen to illustrate the present invention, it will be apparent to those skilled in the art from this disclosure that various change and modification can be made herein without departing from the scope of the invention as defined in the appended claims.

Furthermore, the foregoing descriptions of the embodiments according to the present invention are provided for illustration only, and not for the purpose of limiting the invention, the invention as claimed in the appended claims and their equivalents.

What is claimed is:

1. A control unit for a variable valve timing mechanism for changing a cam phase by an actuator, comprising:
   a processor configured to
      adjust the variable valve timing mechanism to a valve timing suitable for starting an engine when the engine is stopped,
      estimate a cam torque based on an engine rotation angle and a cam phase angle in an engine stop state, and
      correct an operation amount of the actuator immediately after the engine is started so as to cancel the estimated cam torque.

2. The control unit for a variable valve timing mechanism according to claim 1, wherein the processor is configured to correct the operation amount of the actuator according to a cam torque characteristic estimated based on the engine rotation angle and the cam phase angle in the engine stop state.

3. The control unit for a variable valve timing mechanism according to claim 2, wherein:
   a cam torque is defined by a direction and a magnitude, and
   the cam torque characteristic is at least the direction of the cam torque.

4. The control unit for a variable valve timing mechanism according to claim 3, wherein the processor is configured to correct the operation amount of the actuator until the direction of the cam torque is reversed.

5. The control unit for a variable valve timing mechanism according to claim 1, wherein the processor is configured to correct the operation amount of the actuator until the cam phase angle is detected.

6. The control unit for a variable valve timing mechanism according to claim 1, wherein the processor is configured to correct the operation amount of the actuator until an engine speed is equal to or greater than a predetermined value at which the cam torque corresponds to an average value.

7. The control unit for a variable valve timing mechanism according to claim 1, wherein the processor is further configured to correct the operation amount of the actuator according to a water temperature or an oil temperature of the engine.

8. The control unit for a variable valve timing mechanism according to claim 1, wherein the processor is further configured to correct the operation amount of the actuator according to an engine speed.

9. The control unit for a variable valve timing mechanism according to claim 1, wherein when the engine rotation angle varies while the engine is being stopped, the processor is configured to cancel the correction of the operation amount of the actuator.

10. A control method for a variable valve timing mechanism for changing a cam phase by an actuator, comprising:
   adjusting the variable valve timing mechanism to a valve timing suitable for starting an engine when the engine is stopped, estimating, by an electronic control unit for controlling the variable valve timing mechanism, a cam torque based on an engine rotation angle and a cam phase angle in an engine stop state, and correcting, by the electronic control unit, an operation amount of the actuator immediately after the engine is started so as to cancel the estimated cam torque.

11. The control method for a variable valve timing mechanism according to claim 10, wherein correcting the operation amount comprises:

estimating, by the electronic control unit, a cam torque characteristic based on the engine rotation angle and the cam phase angle in the engine stop state, and correcting the operation amount of the actuator according to the estimated cam torque characteristic.

12. The control method for a variable valve tuning mechanism according to claim 11, wherein:

a cam torque is defined by a direction and a magnitude, and the cam torque characteristic is at least the direction of the cam torque.

13. The control method for a variable valve timing mechanism according to claim 12, wherein correcting the operation amount comprises correcting the operation amount until the direction of the cam torque is reversed.

14. The control method for a variable valve timing mechanism according to claim 10, wherein correcting the operation amount comprises correcting the operation amount of the actuator until the cam phase angle is detected.

15. The control method for a variable valve timing mechanism according to claim 10, wherein correcting the operation amount comprises correcting the operation amount of the actuator until an engine speed is equal to or greater than a predetermined value at which the cam torque corresponds to an average value.

16. The control method for a variable valve timing mechanism according to claim 10, comprising:

further correcting the operation amount of the actuator based on a water temperature or an oil temperature of the engine.

17. The control method for a variable valve timing mechanism according to claim 10, wherein the electronic control unit further corrects the operation amount of the actuator according to an engine speed.

18. The control method for a variable valve timing mechanism according to claim 10, comprising:

when the engine rotation angle varies while the engine is being stopped, canceling, by the electronic control unit, the correction of the operation amount of the actuator.

19. A variable valve timing system, comprising:

a variable valve timing actuator configured to change a cam phase of a camshaft; and a processor configured to detect an engine rotation angle and a cam phase angle in an engine stop state, estimate a cam torque based on the detected engine rotation angle and the detected cam phase angle in an engine stop state, and correct an operation amount of the actuator during engine startup so as to cancel the estimated cam torque.

* * * * *